US009600561B2

(12) United States Patent
Bhargava et al.

(10) Patent No.: US 9,600,561 B2
(45) Date of Patent: Mar. 21, 2017

(54) COMPUTER-IMPLEMENTED SYSTEM AND METHOD FOR GENERATING AN INTEREST PROFILE FOR A USER FROM EXISTING ONLINE PROFILES

(71) Applicant: Palo Alto Research Center Incorporated, Palo Alto, CA (US)

(72) Inventors: Preeti Bhargava, Hyattsville, MD (US); Oliver Brdiczka, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 309 days.

(21) Appl. No.: 14/251,460

(22) Filed: Apr. 11, 2014

(65) Prior Publication Data

US 2015/0293989 A1 Oct. 15, 2015

(51) Int. Cl.
*G06F 17/30* (2006.01)
*H04L 29/08* (2006.01)

(52) U.S. Cl.
CPC .... *G06F 17/30598* (2013.01); *G06F 17/3053* (2013.01); *G06F 17/30312* (2013.01); *H04L 67/306* (2013.01); *H04L 67/20* (2013.01)

(58) Field of Classification Search
CPC ......... G06F 17/30539; G06F 17/30029; G06F 17/30761; G06F 17/30828; G06F 17/30867; G06F 17/30572
USPC ........................................ 707/734, 737, 776
See application file for complete search history.

(56) References Cited

U.S. PATENT DOCUMENTS

| 6,385,619 | B1* | 5/2002 | Eichstaedt | G06F 17/30867 707/748 |
|---|---|---|---|---|
| 7,401,087 | B2* | 7/2008 | Copperman | G06F 17/30616 707/737 |
| 7,668,885 | B2* | 2/2010 | Wittke | G06N 5/00 707/705 |
| 8,762,302 | B1* | 6/2014 | Spivack | G06N 5/046 706/12 |
| 2003/0074409 | A1* | 4/2003 | Bentley | H04L 12/5855 709/206 |
| 2006/0156222 | A1* | 7/2006 | Chi | G06F 17/241 715/231 |
| 2007/0061195 | A1* | 3/2007 | Liu | G06Q 30/02 705/14.41 |

(Continued)

*Primary Examiner* — Robert Beausoliel, Jr.
*Assistant Examiner* — Alexandria Bromell
(74) *Attorney, Agent, or Firm* — Patrick J. S. Inouye; Krista A. Wittman (57) ABSTRACT

A computer-implemented system and method for generating an interest profile for a user from user generated content on existing online profiles is provided. Interest categories are maintained in a database and each interest category is associated with an initial interest index score. User generated items are selected from an existing online profile and each user generated item is associated with a weight. For each user generated item, similarity mapping is performed with each of the interest categories in the database by extracting artifacts from each user generated item, calculating an artifact similarity score for each of the extracted artifacts, obtaining a user generated item similarity score for the user generated item, and determining a current interest index score for the user generated item. An interest profile for the user is generated by applying the current interest index score to the interest category.

20 Claims, 8 Drawing Sheets

(56) References Cited

U.S. PATENT DOCUMENTS

| | | | |
|---|---|---|---|
| 2011/0016206 A1* | 1/2011 | Kodialam | G06Q 30/02 709/224 |
| 2012/0102121 A1* | 4/2012 | Wu | G06F 17/30705 709/206 |
| 2012/0191716 A1* | 7/2012 | Omoigui | H01L 27/1463 707/740 |
| 2014/0280214 A1* | 9/2014 | Han | G06F 17/30943 707/748 |

* cited by examiner

COMPUTER-IMPLEMENTED SYSTEM AND METHOD FOR GENERATING AN INTEREST PROFILE FOR A USER FROM EXISTING ONLINE PROFILES

FIELD

This application relates in general to profile modeling and, in particular, to a computer-implemented system and method for generating an interest profile for a user from user generated content on existing online profiles.

BACKGROUND

The Internet allows easy access to a wide range of information from anywhere. Individuals can access Web pages including text, images, videos, and other information using a Web browser via the Internet to search for and obtain desired information. Generally, a search of the Internet can be conducted via search engines, such as Google, provided by Google Inc., Mountain View, Calif., and Internet Explorer, provided by Microsoft Corporation, Redmond, Wash. However, search engines often return large numbers of search results that are time consuming to review. Search queries are not usually sufficient to filter the search results and unable to provide narrowed search results based on interests of the user. On the other hand, many Web pages display online advertisement of a third party while an Internet user is accessing to the Web pages. Online advertisement is usually arranged to display suitable advertisement for the Internet user based on the past browsing histories of the user. Thus, to display optimized search results and suitable advertisement for each Internet user, personalizing information for each Internet user has become an important feature for search engines and online advertisers, such as narrowing the search results or only providing advertisement based on characteristics of the Internet user, such as user interests and preferences.

Traditionally, for identifying user interests, an interest profile is manually created from surveys or questionnaires completed by a user, as well as collected from the user's search activities. For instance, an interest profile for a user can be created from queries entered by the user via a search engine or results provided in response to the user's search activity. Alternatively, an interest profile for a user can be automatically generated via user modeling by extracting and inferring a user's preferences from the user's general behavior while interacting with the Internet. For instance, a method of generating user interest profiles by monitoring and analyzing a user's access to structured documents, such as Web pages, is disclosed in U.S. Pat. No. 6,385,619 to Eichstaedt, et al. Hierarchically structured parts of a document, such as a title, an abstract, and a detailed description are classified into categories in a known taxonomy based on types of content viewed by the user in the document. The types of content are determined based on the text within the documents or classification of the document. The taxonomy tree uses an interest score or a weight associated with each category to measure the importance of the particular category to the user. The weight of a category is derived from the user's clicks on the various parts of the document. The user profile is adjusted based on the user's changing interest by injecting randomly selected documents outside of the scope of the current interest into the categories in the taxonomy tree. However, the method of user interest modeling only creates a user interest profile for implicit user interests based on the user's search histories via search engines and browsing histories. Further, the method uses a textual analysis of the documents for classifying documents in the taxonomy tree; however, the taxonomy is not usually clearly defined by the textual analysis.

Accordingly, there is a need for generating an interest profile for a user based on an explicit information that clearly and explicitly describes interests of the user.

SUMMARY

One embodiment provides computer-implemented system and method for generating an interest profile for a user from user generated content on existing online profiles. A plurality of interest categories are maintained in a database and each interest category is associated with an initial interest index score. User generated items are selected from an existing online profile of the user and each user generated item is associated with a weight. For each user generated item, similarity mapping is performed with each of the interest categories in the database by extracting a plurality of artifacts from each user generated item, calculating an artifact similarity score for each of the extracted artifacts by comparing each of the extracted artifacts against each of the interest categories, obtaining a user generated item similarity score for the user generated item as an average of all the calculated artifact similarity scores, and determining a current interest index score for the user generated item by multiplying the weight of the user generated item to the user generated item similarity score. Then, an interest profile for the user is generated by applying the current interest index score to the interest category.

Still other embodiments of the present invention will become readily apparent to those skilled in the art from the following detailed description, wherein are described embodiments by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
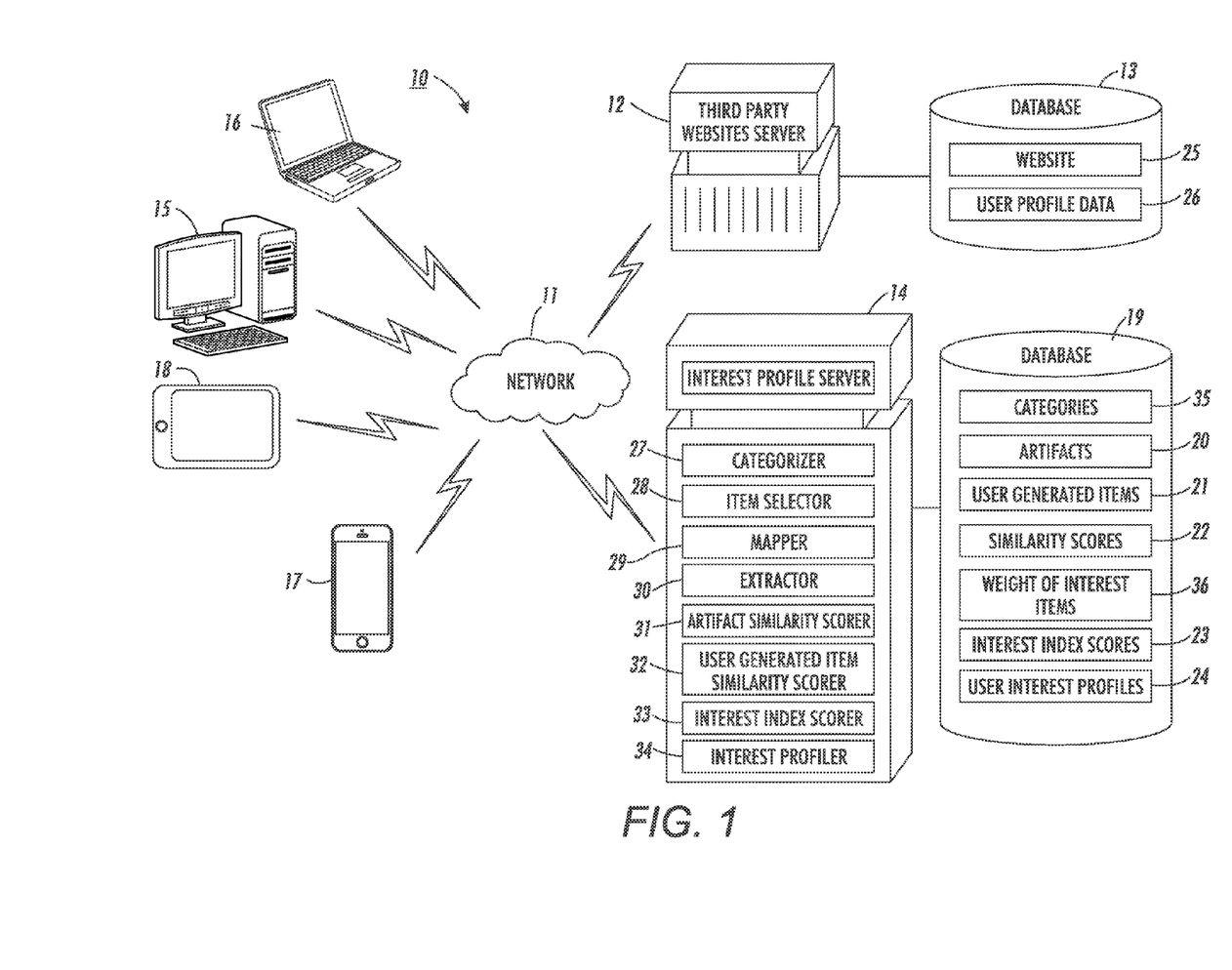
FIG. 1 is a functional block diagram showing an environment for generating an interest profile for a user from an existing online profile, in accordance with one embodiment.

An interest profile for a user generated from an existing online profile of the user can reflect explicit interests or preferences of the user. FIG. 1 is a functional block diagram showing an environment 10 for generating an interest profile from an existing online profile, in accordance with one embodiment. When users use a third party Website 25, the users access to the third party Website 25 stored in a database 13 interconnected to a third party Website server 12 through a network 11 via a desktop 15, portable 16, or mobile 17, 18 computers. While using the third party Website 25, the user can create user profile data 26 and the use profile data 26 is also stored in the database 13. For obtaining user interests and preferences for the use, an interest profile server 14 accesses to the user profile data 26 stored for the third party Website 25 via the third party Website server 12 through the network 11.

Third party Websites can include social media sites, online dating sites, and Websites of professional associations and organizations. Other third party Websites are possible. At a minimum, each Website should include information about a user. Social media sites provide a platform for expressing and sharing personal data including the user's interests and opinions, such as "Facebook," provided by Facebook, Inc., Menlo Park, Calif., "Twitter," provided by Twitter, Inc., San Francisco, Calif., "MySpace," provided by Specific Media LLC, Beverly Hills, Calif., "Google+," provided by Google Inc., Mountain View, Calif., and "LinkedIn," provided by LinkedIn Co., Mountain View, Calif. Other social media sites are possible. Online dating sites can include "eHarmony," provided by eHarmony, Inc., Santa Monica, Calif., "Match.com," provided by Match.com, LLC, Dallas, Tex., and "OkCupid," provided by Humor Rainbow, Inc., New York, N.Y. Other online dating sites are possible. Websites of professional associations and organizations can include nonprofit organizations seeking to assist professionals and public interest. Professional associations and organizations can include academic associations, business and industrial organizations and associations, and bar associations. Other professional associations and organizations are possible.

The interest profile server 14 includes a categorizer or a category module 27, an item selector or user generated item selection module 28, a mapper or mapping module 29, an extractor or artifact extraction module 30, an artifact similarity scorer or artifact similarity score module 31, a user generated item similarity scorer or user generated item similarity score module 32, an interest index scorer or interest index module 33, and an interest profiler or user interest profile module 34. The categorizer 27 generates categories 35 for categorizing user interests based on existing third party classifications. The categories can include potential user interests and preferences. The item selector 28 processes the user profile data 26 and extracts user generated items 21 in the user profile data 26. Obtaining user generated items 21 is further discussed infra with reference to FIG. 2 and FIG. 4. Upon determination of the user generated items 21, the extractor 30 extracts artifacts 20 from each of the user generated items 21. The artifacts are elements of the user generated items. Obtaining artifacts 20 is further discussed infra with reference to FIG. 5 and FIG. 6. The artifact similarity scorer 31 calculates an artifact similarity score 22 between each artifact 20 and each category 35. Then, the user generated item similarity scorer 32 calculates a user generated item similarity score 22 between the category 35 and the user generated item 21 as an average of the artifact similarity scores 22 of all the artifacts 20 for the user generated item 21. An interest index scorer 33 obtains an interest index score 23 by multiplying a weight of the user generated item 36 to the user generated item similarity score 22. Finally, the mapper 29 assigns the interest index score 23 to the category 35. Once all the interest index scores 23 are assigned to each of the categories 35, an interest profile for the user 24 is formed with all the interest index scores 23 to the categories 35. The interest profiler 34 is programmed to repeat the steps performed by the categorizer 27, item selector 28, extractor 30, artifact similarity scorer 31, user generated item similarity scorer 32, interest index scorer 33, and mapper 29. The categories, 35, user generated items 21, artifacts 20, similarity scores 22 including artifact similarity scores and user generated item similarity scores, weight of user generated items 36, interest index scores 23, and user interest profiles 24 are stored in a database 19 interconnected to the interest profile server 14.

Each computer 15-18 includes components conventionally found in general purpose programmable computing devices, such as essential processing unit, memory, input/output ports, network interfaces, and known-volatile storage, although other components are possible. Additionally, the computers 15-18 and the interest profile server 14 can each include one or more modules for carrying out the embodiments disclosed herein. The modules can be implemented as a computer program or procedure written as a source code in a conventional programming language and is presented for execution by the central processing unit as object or byte code or written as inter-credit source code in a conventional interpreted programming language inter-credit by a language interpreter itself executed by the central processing unit as object, byte, or inter-credit code. Alternatively, the modules could also be implemented in hardware, either as intergraded circuitry or burned into read-only memory components. The various implementation of the source code and object byte codes can be held on a computer-readable storage medium, such as a floppy disk, hard drive, digital video disk (DVD), random access memory (RAM), read-only memory (ROM), and similar storage mediums. Other types of modules and module functions are possible, as well as other physical hardware components.

Figure 2:
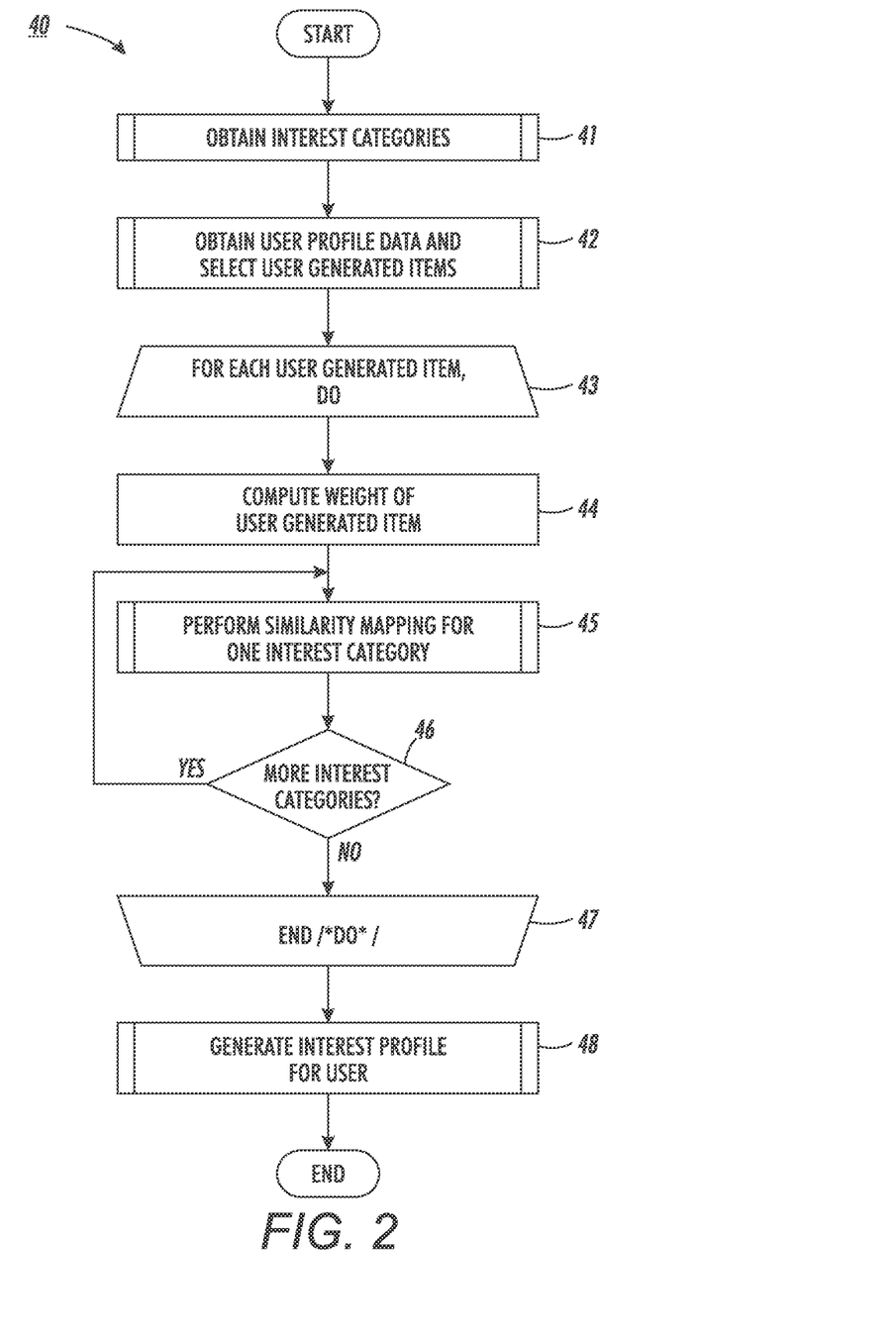
FIG. 2 is a flow diagram showing a process for generating an interest profile for a user from an existing online profile, in accordance with one embodiment.

Generating interest profiles for users from existing online user profiles allows consideration of explicitly defined user interests. FIG. 2 is a flow diagram showing a process 40 for generating an interest profile for a user from an existing online profile, in accordance with one embodiment. First, interest categories are obtained (step 41). The interest categories can be derived from existing categories, such as categories which have been used on third party Websites or any other Website including a list of categories. For instance, Yelp, provided by Yelp, Inc., San Francisco, Calif., includes categories for describing services and businesses on the Yelp Website. Thus, the categories can assist in organizing and classifying interests of a user participating in the third party Websites. In one embodiment, the interest categories can be optimized by the interest profile server to include a wide range of popular interest categories including entertainment, food, news, people and organizations, pets, places for recreation and sightseeing, recreational activities and sports, shopping, and so on. The interest categories can further include subcategories under each category. In one embodiment, the interest categories can be formed as a hierarchy tree and each interest category and subcategory are taxonomically arranged into several levels as parent and child interest category nodes, as further described infra with reference to FIG. 3.

Figure 4:
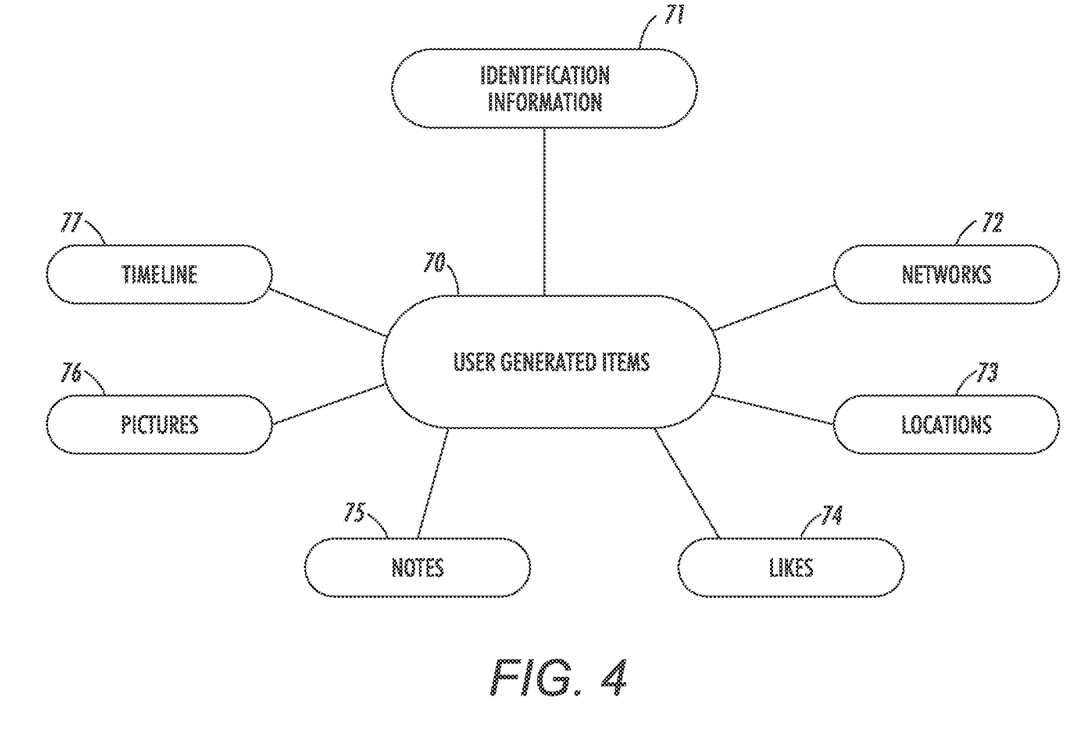
FIG. 4 is a functional block diagram showing examples of user generated items obtained from existing online profiles, in accordance with one embodiment.

Next, user profile data is also obtained from the third party Websites including social media sites, online dating sites, and Web pages for professional associations and organizations as user generated items (step 42), as further described infra with reference to FIG. 4. Each third party Website may provide a Web-based platform that allows a user to create a user profile and to share user interests and activities with other users. The individual user profile data usually includes information, such as identification information, likes and dislikes, networks, user interests, pictures, and activities within the third party Website. Any part of the user profile data found on the third party Website can be a user generated item. For instance, in the user profile data, a user lists books and authors she likes. The title of each book listed can become a user generated item. Alternatively, the authors can become user generated items. For instance, if a user likes a Facebook page of "Pride and Prejudice," a user generated item can be the Facebook page of "Pride and Prejudice." Other ways to select user generated items are possible. Each obtained user generated item is separately selected and processed for performing similarity mapping for each interest category based on similarity between each user generated item and the interest category (steps 43-47).

For obtaining accurate interest profiles, user generated items are normalized and a weight is assigned to each user generated item (step 44). Each user generated item can be normalized within user generated items in the same or similar category. Usually, user generated items are considered to be similar when they appear in a same category predefined by a third party Website. For instance, all the notes appear on "Notes" on Facebook user profile data, those notes are considered to be similar. Similarly, all the albums appear on "Albums" on Facebook user profile data, those albums are considered to be similar. Other ways to determine similarity between user generated items are possible. A weight for each user generated item represents relative importance granted to the user generated item. For instance, if a user specifies many different genres of books as her favorite books on a third party Website, such as Romance, Sci-Fi, Adventure, Foreign, Documentary, and so on, a weight of her interest to each genre of books can be low due to the broad range of genres of interest to the books. On the other hand, if the user specifies only one genre, such as Romance as her favorite books, the user generated item within that genre can be assigned a higher weight. Other ways to perform normalization of user generated items are possible.

User generated items can be further categorized as static user generated items which rarely change or dynamic user generated items which are often updated. For dynamic user generated items, in addition to the normalization, the weights can be further associated with time stamps when the user generated item are created on a third party Website and then become timed weights. Timed weights can signify decaying levels of interest in a series of dynamic items over time. The decay is a function of the time that has passed as the dynamic item was updated. The obtained weight, including regular weight and timed weight, for each user generated item is later used for determining an interest index score for each interest category. Other types of timed weights are possible.

Once one user generated item is processed for similarity mapping with one interest category (step 45), the same user generated item is processed with other interest categories until all the interest categories are processed for the similarity mapping (step 46). Then, other user generated items are similarly processed as steps 43-47 until all the user generated items are separately processed (step 47). In this way, each user generated item is compared with each interest category for similarity and the similarity scores are assigned to each interest category. Then, the interest categories form an interest profile for a user with all the similarity data of each user generated item (step 48).

Interest categories provide a starting point for generating an interest profile for a user as each user generated item for the user can be compared with the interest categories to determine a user's interest in that category. By way of example, the user interest categories can include categories, such as entertainment, food, news, people and organizations, pets, places for recreation and sightseeing, recreational activities and sports, shopping, and so on. Interest categories can be derived from existing and defined categories offered by third parties, such as a category list used by Yelp, as described supra, and categories from Facebook. For example, the Yelp category list covers a wide range of categories which are fine-grained for identifying business and services listed on the Yelp Website. On the other hand, the Facebook categories are generic and coarse-grained categories, such as only six categories identifying an entity of Facebook. In one embodiment, interest categories can be generated as a combination of existing defined categories. For instance, interest categories can be a combination of the Yelp categories and Facebook categories. Other types of interest categories are possible.

Figure 3:
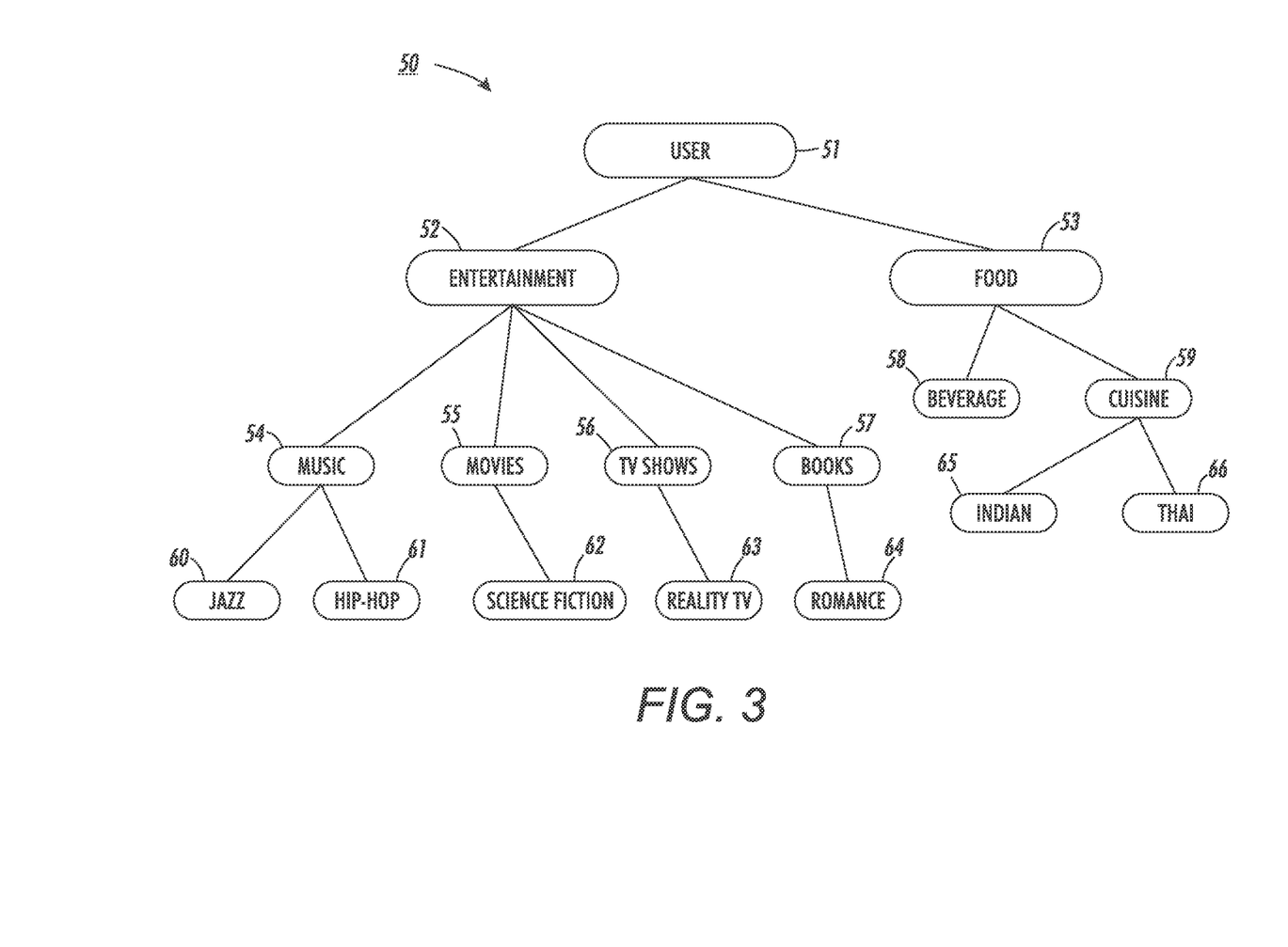
FIG. 3 is a functional block diagram showing a hierarchy tree of interest categories, in accordance with one embodiment.

The interest categories can include further subcategories for each interest category. In one embodiment, the interest categories and subcategories can be taxonomically organized as nodes in a hierarchy tree. FIG. 3 is a functional block diagram showing a hierarchy tree 50 of interest categories for a user, in accordance with one embodiment. The hierarchy tree 50 can include several parent interest category nodes, such as Entertainment 52 and Food 53. The parent interest category nodes are located at the top level of the hierarchy tree 50 and usually include the broadest topics in the hierarchy tree 50. The parent interest category nodes can be further classified into multiple subcategories, such as child interest category nodes and grandchild interest category nodes. The child interest category nodes are usually subcategories of a parent interest category node. Each child interest category node can be further classified into grandchild interest category nodes. Thus, grandchild interest category nodes provide more fine-grained categories than each child interest category node and the child interest category nodes provide more fine-grained categories than the parent interest category node. In this specific example, a parent interest category node, Entertainment 52, is classified into further subcategories, such as Music 54, Movies 55, TV shows 56, and Books 57. Similarly, another parent interest category node, Food 53, is classified into further subcategories, such as Beverage 58 and Cuisine 59. Those child interest category nodes can be further classified into grandchild interest category nodes, such as Jazz 60 and Hip-Hop 61 as child interest category nodes for Music 54, Science Fiction 62 as a child category node for Movies 55, Reality TV 63 as a child interest category node for TV shows 56, Romance 64 as a child interest category node for Books 57, and Indian 65 and Thai 66 as child interest category nodes for Cuisine 59. Other levels of nodes and types or formats of the interest categories are possible.

For each user, a plurality of user generated items are identified from user profile data on third party Websites, such as social media sites, online dating sites, Websites of professional associations and organizations. FIG. 4 is a functional block diagram showing examples of user generated items 70 obtained from existing online profiles, in accordance with one embodiment. User profile data obtained from third party Websites usually includes user generated items of a user including static user generated items and dynamic user generated items. Examples of user generated items include identification information 71, networks 72, locations 73, likes 74, notes 75, pictures 76, and timelines 77. Identification information 71 can include names, gender, birthday, age, race, language, nationality, education, work history, and so on. Networks 72 can include a list of friends of the user and communities, groups, associations, and organizations to which a user belongs. Locations 73 can include geographic information where you have been to or you are interested to visit in the future and so on. Likes 74 can include interests and preferences of the user in virtually anything, such as books, music, movies, sports, brand, colors, countries, food, drinks, specific Facebook pages, and so on. Notes 75 can include comments, posts, blogs, memos, annotations, write-ups, and so on. Pictures 76 can include pictures the user has taken and uploaded on the third party Websites and pictures taken and uploaded by others. Timelines 77 can reflect activities of a user include status information, comments, posts, and so on, associated with a certain time frame, usually displayed on the third party Websites with a time stamp.

The user generated items which are less likely to change or that are rarely updated by the user on a regular basis are categorized as static user generated items. In this specific example, identification information 71, networks 72, locations 73, likes 74, notes 75, and pictures 76 are static user generated items. By way of example, a user profile on Facebook includes static user generated items, such as identification information 71, a list of friends with whom the user is associated as a network 72, a list of places or "Check-Ins" that the user has visited as locations 73, Facebook pages the user likes, called "Liked Pages" as likes 74, notes and write-ups created by the user as notes 75, and pictures of the user or pictures the user has taken and uploaded onto the Facebook page as pictures 76. Other static user generated items can include a work history, education, relationship, family, places lived, sports, music, movies, TV shows, books, events, groups, fitness, health & wellness, and travel & experiences, as well as other static items.

On the other hand, the user generated items which are changed and updated by a user more frequently than static user generated items and represent the user's interest at a specific time are categorized as dynamic user generated items. In this example, timelines 77, which can reflect the user's activities are dynamic user generated items. By way of example, Facebook activity, such as status updates and posts along with comments and likes, posts on a user's Facebook page from other users, and other posts and links that the user has shared, each represents interests of the user at a specific time and thus is considered to be dynamic. Other dynamic user generated items are possible. User generated items including static user generated items and dynamic user generated items can be retrieved from the third party Websites as text data and stored in a text file for each user in a database. Other retrieval methods of user generated items are possible. In a further embodiment, to obtain user generated items, target third party Websites can be selected by performing search operations with queries, such as described in commonly-assigned U.S. Patent application, entitled, "Method And System For Building An Entity Profile From Email Address And Name Information," Ser. No. 13/660,959, filed on Oct. 25, 2012, pending, the disclosure of which is incorporated by reference.

Further, each dynamic user generated item can be subjected to a sentiment analysis to determine the attitude or emotional state of a speaker or writer with respect to dynamic user generated items. Static user generated items are usually considered to be positive or neutral as user profile data tends to only include interests and preferences. Thus, the sentiment analysis is performed to remove negative user generated items obtained from user profile data on the third party Websites before each user generated item is processed for similarity mapping. Sentiment polarity of each user generated item can be determined as negative, neutral, or positive. The sentiment analysis can be performed via natural language processing techniques, such as provided by Alchemy API, Inc., Denver, Colo. In a further embodiment, sentiment analysis can be performed using a sentiment dictionary, such as described in commonly-assigned U.S. Patent application, entitled, "Method And System For Physiological Analysis By Fusing Multiple-View Predictions," Ser. No. 13/663,747, filed on Oct. 30, 2012, pending, the disclosure of which is incorporated by reference. Then, dynamic user generated items that show neutral or positive sentiment are selected for user generated items.

Figure 5:
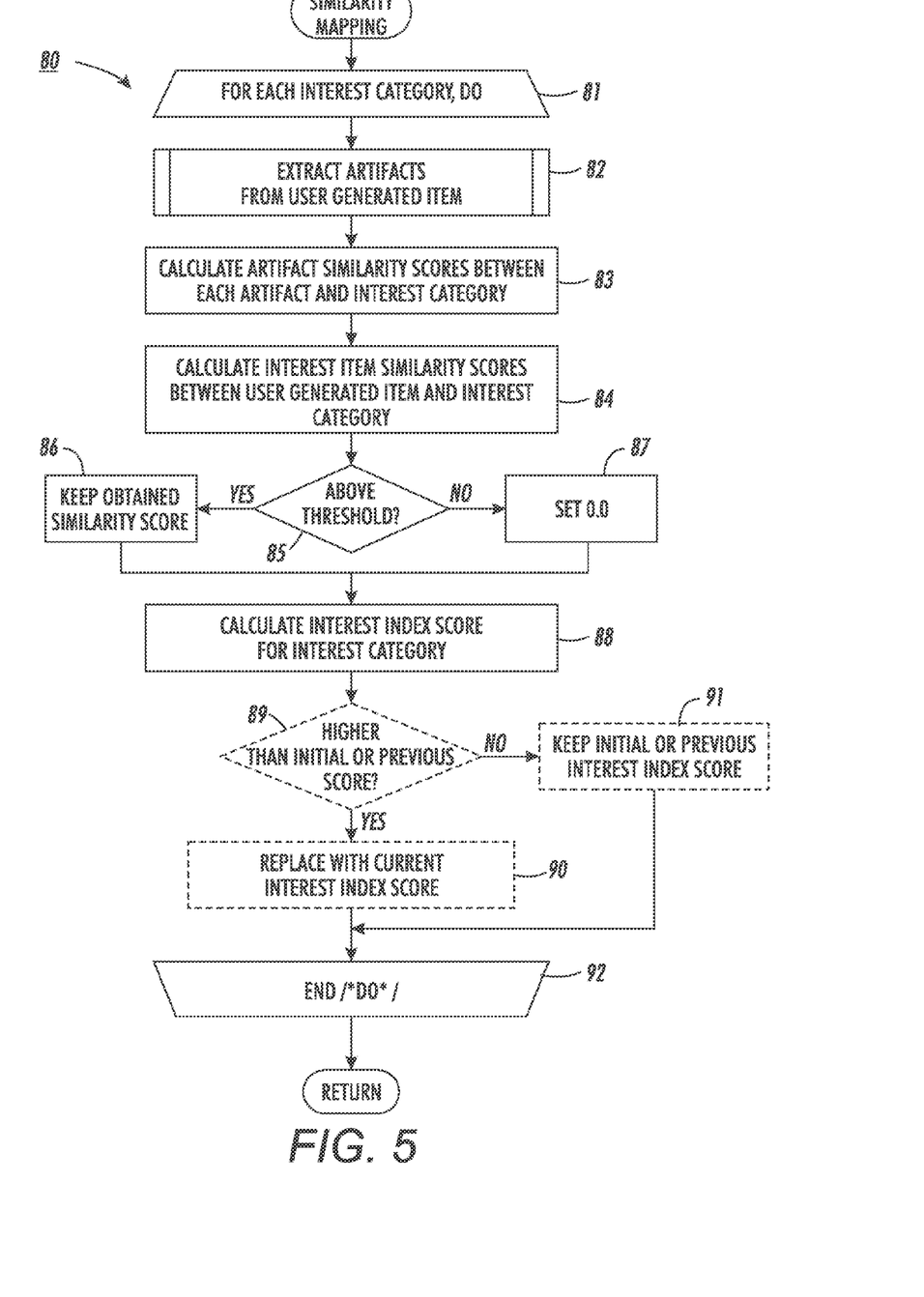
FIG. 5 is a flow diagram showing a method for performing similarity mapping for each user generated item with each of the interest categories, in accordance with one embodiment.
Figure 6:
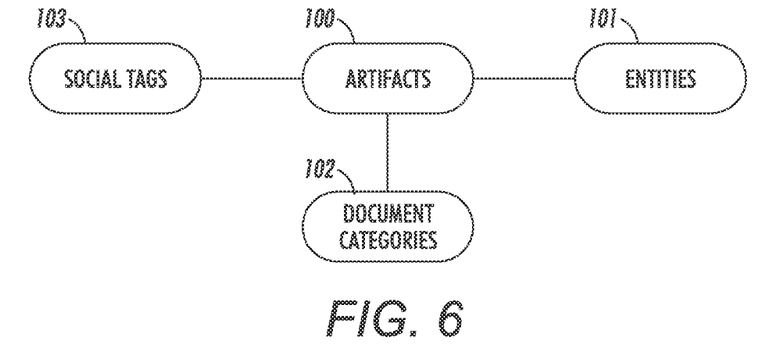
FIG. 6 is a functional block diagram showing examples of artifacts, in accordance with one embodiment.

Once the user generated items including static and dynamic user generated items are obtained, each user generated item is processed for similarity mapping with each of the interest categories. FIG. 5 is a flow diagram showing a method 80 for performing similarity mapping for each user generated item with each of the interest categories, in accordance with one embodiment. For each user generated item, similarity mapping is separately performed for each of the categories as follows (steps 81-92). From each selected user generated item, artifacts are extracted (step 82). Artifacts are elements of user generated items and further classify the user generated items. Thus, a plurality of artifacts can be derived from a single user generated item. In other words, each artifact partially represents a user generated item. FIG. 6 is a functional block diagram showing examples of artifacts 100, in accordance with one embodiment. Artifacts can include entities, document categories, and social tags. Entities 101 identify person, place, or object, such as names of persons, companies, organizations, geographies, and so on, from the user generated item. Further, the entities 101 can be determined based on named-entity recognition techniques, such as OpenCalais, provided by Thomson Reuters, New York, N.Y. For instance, the named-entity recognition can locate and classify entities from the texts of each user generated item. Other entity recognition techniques are possible. Document categories 102 can be similarly determined by classifying the text of each user generated item based on its content or subject into a fixed set of document categories, such as Education, Finance, Entertainment, and so on. Document categories can be based on the Facebook Page categories if the user generated item is derived from the Facebook user profile. Other document categories are possible. Further, social tags 103 or common sense tags that convey additional semantic information about the user generated item can be obtained as artifacts for each user generated item. By way of example, if a user likes a Facebook page of "Pride and Prejudice," "Pride and Prejudice" is classified as a static user generated item and can include artifacts, such as:

Entities (Type): Pride and Prejudice (Movie), Elizabeth Bennet (Person), United Kingdom (Country), Jane Austen (Person)

Document Category: Education, Facebook Category: Book

Social Tags: "Film," "Literature," "Pride and Prejudice," "Jane"

Other artifact extraction methods are possible.

Once the artifacts are extracted, a similarity between each artifact and interest category is determined (step 83). Calculating an artifact similarity score between each artifact and interest category provides more fine-grained similarity analysis than only calculating an artifact similarity score between each user generated item and interest category as artifacts are elements of a user generated item. The artifact similarity score between the interest category and each of the obtained artifacts can be calculated based on semantic relatedness between each artifact and each interest category. Semantic relatedness is a metric for determining the similarity of two documents or phrases based on their semantic meanings. As semantic relatedness is cosine similarity measure, the similarity can be scaled between 0 and 1, where 0 signifies no relatedness and 1 signifies high relatedness. By way of example, Semantic Textual Similarity can be used to calculate the semantic similarity score. For instance, an artifact similarity score between an artifact "Literature" from a user generated item "Pride and Prejudice" and an interest category "Books" can be determined as 0.8 since "Literature" is a subcategory of books. Other methods of calculating artifact similarity scores between each artifact and interest category are possible. After obtaining the artifact similarity score for each artifact, a user generated item similarity score for the user generated item is calculated based on the artifact similarity score of the artifact (step 84). The user generated item similarity score for the user generated item can be calculated as an average of all the artifact similarity scores associated with a common user generated item. For instance, extracted artifacts for a user generated item "Pride and Prejudice" are "Jane Austen," "Education," and "Literature" and artifact similarity scores for each artifacts with an interest category "Books" are respectively 0.6, 0.3, and 0.8, then a user generated item similarity score for a user generated item "Pride and Prejudice" is calculated as 0.56 for "Books" category. However, when compared to a different category of Music, the user generated item similarity score becomes lower since there is less relatedness between "Music" and "Jane Austen," "Education," and "Literature" respectively. As another example, the semantic relatedness between "Money" as a user interest category and "Investment" as a user generated item is 0.6635. Thus, if the user has expressed an interest in a user generated item related "Money," the user's interest in the interest category "Investment" would be likely high. Other methods of calculating user generated item similarity scores between each user generated item and interest category are possible.

To remove noise from the user generated item similarity score calculation, the user generated item similarity scores are compared to a certain threshold level. The user generated item similarity score for the user generated item is compared with a threshold level of a user generated item similarity score. A threshold is predefined and set as 0.293. Alternatively, the threshold can be set empirically based on performance. If the obtained user generated item similarity score for the user generated item is above the threshold level (step 85), the user generated item similarity score is maintained (step 86). If the obtained user generated item similarity score is below the threshold level, the user generated item similarity score is considered as a noise and replaced with 0.0 for that category (step 87). For instance, the similarity between the user generated item "Pride and Prejudice" and an interest category "Food" can be determined as 0.1 and as a threshold level of a user generated item similarity score is set as 0.293, the user generated item similarity score for the user generated item is replaced with 0.0. Other ways to remove noise from the user generated item similarity score calculation are possible.

Before assigning the obtained user generated item similarity score for the user generated item to the interest category, the user generated item similarity score for the user generated item is normalized based on a weight of the user generated item. The normalization of the user generated item similarity score for the user generated item is performed by multiplying the weight of the user generated item with the user generated item similarity score of the user generated item. The weight of the user generated item is described supra with reference to FIG. 2. Then, the obtained weighted user generated item similarity score for the user generated item is labeled as an interest index score for the interest category (step 88). In case where the user generated item is a dynamic user generated item, the weight of the user generated item is associated with a time stamp when the user generated item is created on a third party Website, as described supra with reference to FIG. 2. The interest index score assigned to each interest category can indicate an interest of a user in each interest category as a score between 0 and 1 by computing semantic relatedness between each user generated item and interest category.

Interest categories are initially assigned 0.0 as an initial interest index score before similarity mapping. If the interest index scores have been already assigned to each index category or initial interest index score 0.0 is assigned to the index category, the newly calculated interest index score for the interest category is compared with the initial or previous interest index score (step 89). If the current interest index is higher than the initial or previous score, the initial or previous interest index score for the interest category is replaced with the current interest index score (step 90). If the current interest index score is lower than the initial or previous interest index score, then the initial or previous interest index score is maintained for the interest category (step 91). In this way, the current interest index is always updated with any new user generated item of a user discovered in the third party Websites. Other ways to update an interest category score are possible. Once the similarity mapping for one interest category is performed, a process of the similarity mapping is repeated for other interest categories (steps 81-92).

Figure 7:
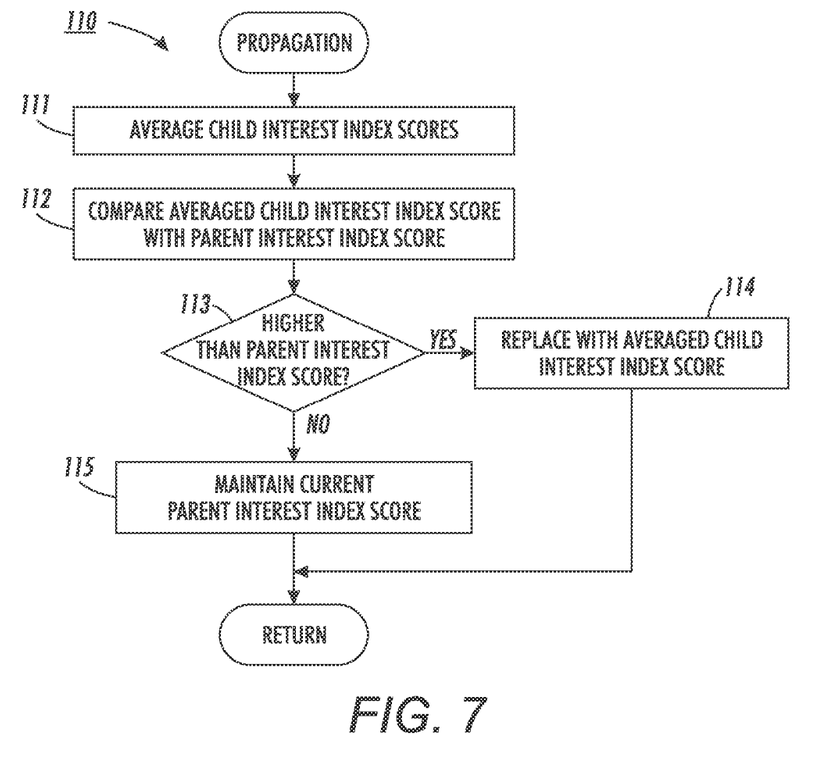
FIG. 7 is a flow diagram showing a method for adjusting an interest index score for each interest category in a hierarchy, in accordance with one embodiment.
Figure 8:
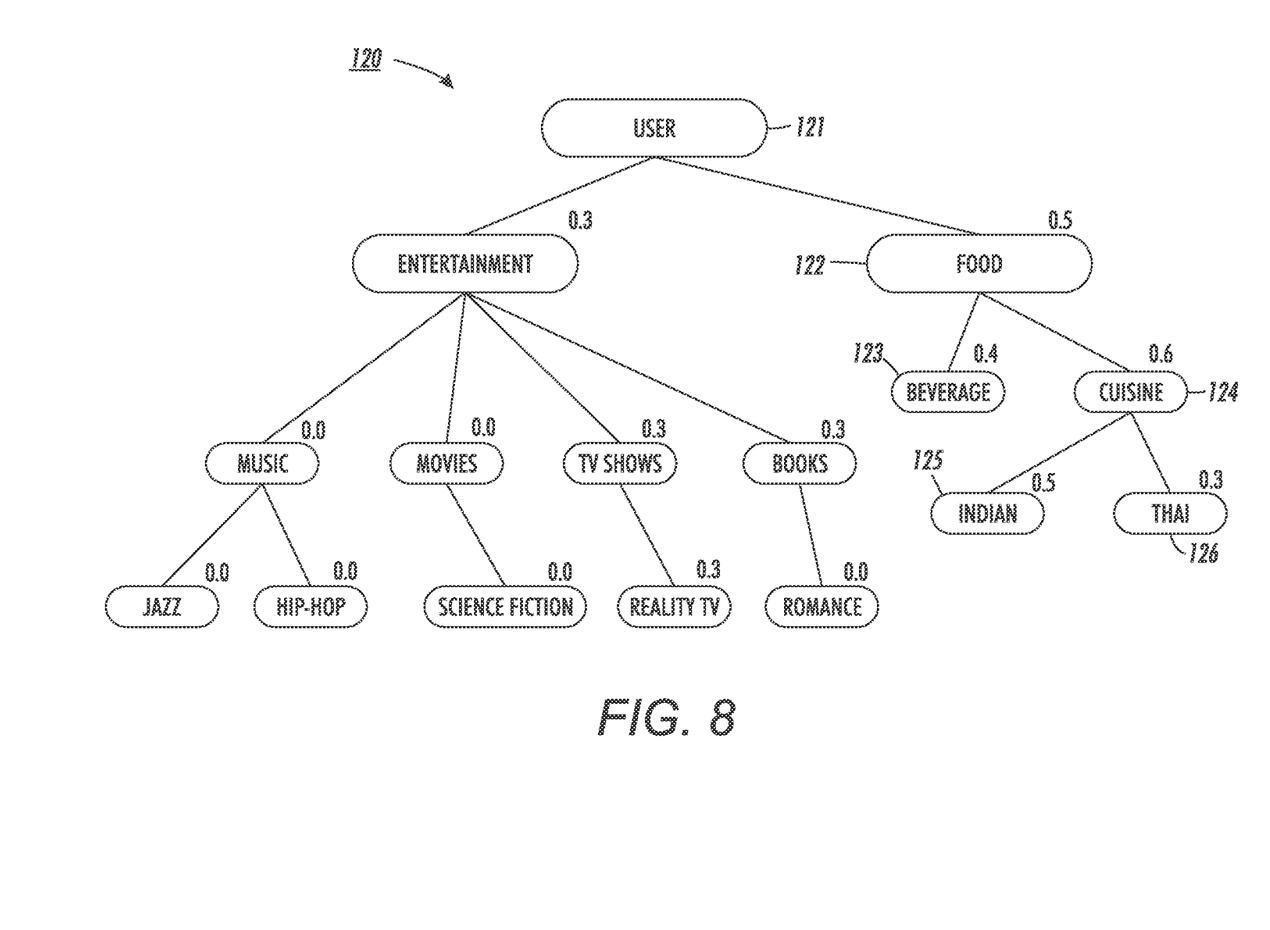
FIG. 8 is a functional block diagram showing an interest profile for a user generated by similarity mapping, in accordance with one embodiment.

If interest categories are taxonomically arranged as a hierarchy tree, as discussed supra with reference to FIG. 3, a current interest index score for a parent interest category node in the hierarchy can be adjusted based on child interest category nodes. FIG. 7 is a flow diagram showing a method 110 for adjusting an interest index score for each interest category in a hierarchy, in accordance with one embodiment. By way of example, when a user explicitly expresses an interest in a child interest category node, such as Jazz (60 in FIG. 3), the user is likely to have an interest in Music (54 in FIG. 3) as well since Jazz is a subcategory of Music and a child interest category node of Music. Thus, any interest category node positioned higher than lower interest category nodes, such as parent interest category nodes, must be adjusted based on the lower interest category nodes, such as child interest category nodes, to reflect the interest in the lower interest category node, by propagating an averaged interest index score of child interest category nodes to a parent interest category node. First, all the current interest index scores of child interest category nodes are averaged (step 111). Then, the averaged child interest index score is compared with a current interest index score of a parent category node located right above the child interest category nodes in the hierarchy (step 112). If the averaged child interest index score is higher than the current interest index score of the parent interest category node (step 113), then the current interest index score for the parent interest category node is replaced with the averaged child interest index score (step 114). If not, the parent interest index score is maintained (step 115). By way of example, FIG. 8 is a functional block diagram showing an interest profile 120 for a user 121 generated by similarity mapping, in accordance with one embodiment. In this example, Thai 126 obtains 0.3 current interest index score and Indian 125 also obtains 0.5 current interest index score. In that example, the averaged child interest index score is 0.4. If Cuisine 124 is associated with a 0.6 current interest index score, then the 0.6 current interest index score for Cuisine is maintained since the averaged child current interest index score of 0.4 is lower than the parent current interest index score 0.6. Similarly, Beverage 123 is associated with a 0.4 current interest index score and the averaged child interest index score for the level (Beverage 123 and Cuisine 124) is 0.5. If Food 122 has a 0.0 interest index score, the 0.0 score is replaced with 0.5 since the averaged child interest index score of 0.5 is higher than the parent interest index score 0.0. In this way, every two levels in the hierarchy, such as a parent interest category node level and child interest category node level, are compared and the current interest index score for the parent interest category node is updated by propagating the averaged child interest index score to the parent interest index category. Propagation of interest index scores from lower levels of interest category nodes to higher levels of interest category nodes enables consistency of interest index scores within each family in the hierarchy. Other methods of propagating interest index scores within a family in the hierarchy are possible. Further, if the maximum current interest index score for the user generated item among all the interest categories in the hierarchy is lower than a predefined threshold level, the user generated item must be added to a list of the interest categories as a newly discovered interest category.

Finally, once all the interest index scores are determined, an interest profile for a user is generated. In this example, a user generated item "Ramen" (not shown) is mapped over to each interest category node, including Food 122, including Beverage 123, Cuisine 124, Indian 125, and Thai 126. The right corner branch of each interest category node 122-126 shows a current interest index score for the interest category node. If next user generated item is applied to the interest profile 120, then the similarity mapping with the next user generated item is performed. In this way, the interest profile 120 for the user 121 is always updated with interest index scores for new user generated items.

Figure 9:
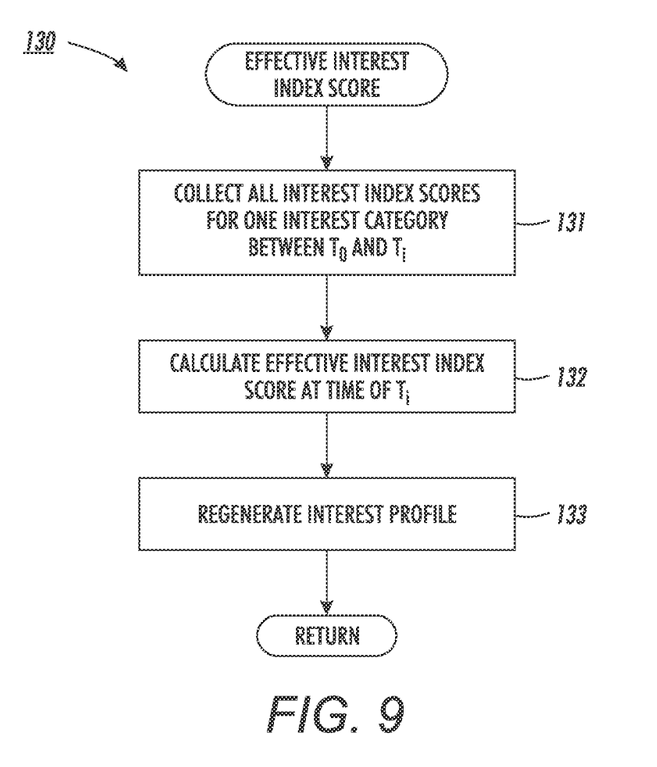
FIG. 9 is a flow diagram showing a method for calculating an effective interest index score for each interest category at a time of Ti, in accordance with one embodiment.

Dynamic user generated items are constantly changing as interests of a user transition over time. Thus, to understand the transition of the user interests and to accurately describe interests of the user in an interest profile for the user, an effective interest index score is calculated by applying a decay function. FIG. 9 is a flow diagram showing a method 130 for calculating an effective interest index score for each interest category at a time of Ti, in accordance with one embodiment. To obtain an effective interest index score for an interest category at a specified time Ti, first, all the interest index scores assigned to the interest category during a start time $T_0$ to the specified time Ti are collected (step 131). The effective interest index score EWn for each interest category can be calculated with an initial interest index score at the time of $T_0$ (IWn) and the interest index score at the time of Ti (TWi) as $EWn = IWn \times \Pi_{i=1}^{k}(1 + Twi \times e^{-\lambda \delta(TNow - TLastUpdate)})$ using an exponential decay constant $\lambda = 1$ and time difference measured in days (step 132).

The obtained effective interest index score for each interest category is mapped over to the interest profile of the user and a node score is assigned as a scale of 1-5 to the interest category (step 133). Other methods of calculating effective interest index scores are possible.

While the invention has been particularly shown and described as referenced to the embodiments thereof, those skilled in the art will understand that the foregoing and other changes in form and detail may be made therein without departing from the spirit and scope.

What is claimed is:

1. A computer-implemented system for generating an interest profile for a user, comprising:
  a database to store a plurality of interest categories, each interest category is associated with an initial interest index score; and
  a server to access one or more third party servers to obtain one or more online profiles of a user from the third party servers, wherein each online profile comprises data entered by the user and comprising a central processing unit, memory, input port to receive the interest categories from the database, and output port, the central processing unit configured to execute modules comprising:
    an item selection module configured to select user generated items from the online profile of the user, each user generated item is associated with a weight;
    an identification module to identify each user generated item as one of dynamic and static and assigning values for the weights based on whether each such user generated item is dynamic or static;
    an analysis module to perform sentiment analysis by determining one of an attitude and emotional state of the user for one or more dynamic user generated items and to assign a sentiment polarity to each of the one or more dynamic user generated items;
    for each user generated item, a mapping module configured to perform similarity mapping with each of the interest categories in the database, comprising:
      an artifact extraction module configured to extract a plurality of artifacts from each user generated item;
      an artifact similarity score module configured to calculate an artifact similarity score for each of the extracted artifacts by comparing each of the extracted artifacts against each of the interest categories;
      a user generated item similarity score module configured to obtain a user generated item similarity score for the user generated item as an average of all the artifact similarity scores;
      a current interest index score module configured to determine a current interest index score for the user generated item by multiplying the weight of the user generated item to the user generated item similarity score;

a comparison module configured to compare the current interest index score for the user generated item with the initial interest index score for each interest category; and a replacement module configured to replace the initial interest index score for the interest category with the current interest index score provided that the initial interest index score is below the current interest index score; and an interest profile module configured to generate an interest profile for the user by applying the current interest index score to the interest category.

2. A system according to claim 1, further comprising:

a hierarchy module configured to organize the interest categories taxonomically arranged into several levels as parent interest category nodes and child interest category nodes based on a taxonomy of the interest categories; and a propagation module configured to adjust, for a parent interest category node in the hierarchy, the current interest index score of the parent interest category node based on the current interest index scores of the child interest category nodes; comprising:

an average child interest category node module configured to take an average of all the current interest index scores of the child interest category nodes;

a child interest category node comparison module configured to compare the current interest index score of the parent interest category node with the averaged current interest index score of the child interest category nodes; and a child interest node replacement module configured to replace the current interest index score of the parent interest category node with the averaged current interest index score of the child interest category nodes provided that the current interest index score of the parent interest category node is lower than the averaged current interest index score of the child interest category nodes.

3. A system according to claim 1, wherein the weight of the user generated item is further associated with a time stamp when the user generated item is obtained from at least one of the online profiles.

4. A system according to claim 3, further comprising:

an effective interest index score module configured to calculate an effective interest index score for an interest category at a specified time, comprising:

the database storing each current interest index score for the interest category with the time stamp; and a current interest index score sum module configured to sum all the current interest index scores of the interest category stored in the database during a start time and the specified time and applying a decay function; and an effective interest index score application module configured to apply the effective interest index score to the interest category.

5. A system according to claim 1, wherein the user generated items on the online profile are static items comprising at least one of quotes, identification information, networks, locations, likes, notes, and pictures.

6. A system according to claim 1, wherein the user generated item similarity score is set to zero if the user generated item similarity score is below a threshold.

7. A system according to claim 1, wherein the artifact similarity scores and the user generated item similarity scores are computed based on semantic matching between at least one of the artifact and the interest category and the user generated item and the interest category.

8. A system according to claim 1, wherein the weight of each user generated item is obtained by normalization with similar user generated items.

9. A system according to claim 1, wherein the initial interest index score for each interest category is set as zero.

10. A system according to claim 1, wherein the user generated items on the online profile are dynamic items comprising at least one of comments and postings.

11. A computer-implemented method for generating an interest profile for a user, comprising steps of:

maintaining a plurality of interest categories in a database, each interest category is associated with an initial interest index score;

accessing one or more third party servers and obtaining one or more online profiles of a user from the third party servers, wherein each online profile comprises data entered by the user;

selecting user generated items from the online profile of the user, each user generated item is associated with a weight;

identifying each user generated item as one of dynamic and static and assigning values for the weights based on whether each such user generated item is dynamic or static;

performing sentiment analysis, comprising:

determining one of an attitude and emotional state of the user for one or more dynamic user generated items; and assigning a sentiment polarity to each of the one or more dynamic user generated items;

for each user generated item, performing similarity mapping with each of the interest categories in the database, comprising further steps of:

extracting a plurality of artifacts from each user generated item;

calculating an artifact similarity score for each of the extracted artifacts by comparing each of the extracted artifacts against each of the interest categories;

obtaining a user generated item similarity score for the user generated item as an average of all the calculated artifact similarity scores; and determining a current interest index score for the user generated item by multiplying the weight of the user generated item to the user generated item similarity score;

comparing the current interest index score for the user generated item with the initial interest index score for each interest category; and replacing the initial interest index score for the interest category with the current interest index score provided that the initial interest index score is below the current interest index score;

generating an interest profile for the user by applying the current interest index score to the interest category, wherein a non-transitory computer readable storage medium stores code for executing on a computer system to perform all the method steps.

12. A method according to claim 11, further comprising:

organizing the interest categories taxonomically arranged into several levels as parent interest category nodes and child interest category nodes based on a taxonomy of the interest categories; and for a parent interest category node in the hierarchy, adjusting the current interest index score of the parent interest category node based on the current interest index scores of the child interest category nodes; comprising:

taking an average of all the current interest index scores of the child interest category nodes;

comparing the current interest index score of the parent interest category node with the averaged current interest index score of the child interest category nodes; and replacing the current interest index score of the parent interest category node with the averaged current interest index score of the child interest category nodes provided that the current interest index score of the parent interest category node is lower than the averaged current interest index score of the child interest category nodes.

13. A method according to claim 11, wherein the weight of the user generated item is further associated with a time stamp when the user generated item is obtained from at least one of the third party Websites.

14. A method according to claim 13, further comprising:

calculating an effective interest index score for an interest category at a specified time, comprising:

storing each current interest index score for the interest category with the time stamp in the database; and summing all the current interest index scores of the interest category stored in the database during a start time and the specified time and applying a decay function; and applying the effective interest index score to the interest category.

15. A method according to claim 11, wherein the user generated items on the online profile are static items comprising at least one of quotes, identification information, networks, locations, likes, notes, and pictures.

16. A method according to claim 11, wherein the user generated item similarity score is set to zero if the user generated item similarity score is below a threshold.

17. A method according to claim 11, wherein the artifact similarity scores and the user generated item similarity scores are computed based on semantic matching between at least one of the artifact and the interest category and the user generated item and the interest category.

18. A method according to claim 11, wherein the weight of each user generated item is obtained by normalization with similar user generated items.

19. A method according to claim 11, wherein the initial interest index score for each interest category is set as zero.

20. A method according to claim 11, wherein the user generated items on the online profile are dynamic items comprising at least one of comments and postings.

* * * * *